United States Patent
Unrau

(10) Patent No.: US 9,603,307 B2
(45) Date of Patent: Mar. 28, 2017

(54) LEAF SCREEN CLEANER

(71) Applicant: AGCO Corporation, Hesston, KS (US)

(72) Inventor: Zane W Unrau, Wichita, KS (US)

(73) Assignee: AGCO Corporation, Duluth, GA (US)

( * ) Notice: Subject to any disclaimer, the term of this patent is extended or adjusted under 35 U.S.C. 154(b) by 139 days.

(21) Appl. No.: 14/581,327

(22) Filed: Dec. 23, 2014

(65) Prior Publication Data

US 2015/0173295 A1    Jun. 25, 2015

Related U.S. Application Data

(60) Provisional application No. 61/919,963, filed on Dec. 23, 2013.

(51) Int. Cl.
| | | |
|---|---|---|
| *A01D 41/12* | (2006.01) | |
| *A01F 12/44* | (2006.01) | |
| *B07B 1/12* | (2006.01) | |
| *B07B 1/52* | (2006.01) | |
| *B08B 1/00* | (2006.01) | |
| *A01B 71/08* | (2006.01) | |

(52) U.S. Cl.
CPC ............ *A01F 12/444* (2013.01); *A01B 71/08* (2013.01); *B07B 1/12* (2013.01); *B07B 1/526* (2013.01); *B08B 1/008* (2013.01)

(58) Field of Classification Search
CPC ....... A01D 41/12; A01D 41/1252; A01F 7/00; A01F 7/06; A01F 12/442; A01F 12/444; B01D 46/10; B01D 46/26; B01D 46/0065; B01D 13/001; B01D 29/445; B01D 29/6484; B01D 29/01; F01P 11/12; A01B 71/08; B07B 1/12; B07B 1/526; B08B 1/008

USPC .......... 55/289, 290; 210/791, 154, 159, 162, 210/241, 413; 460/100, 119, 10
See application file for complete search history.

(56) References Cited

U.S. PATENT DOCUMENTS

| | | | | | |
|---|---|---|---|---|---|
| 3,487,623 | A | * | 1/1970 | Easter | B01D 46/10 15/159.1 |
| 4,198,802 | A | * | 4/1980 | Hengen | A01F 12/442 460/67 |
| 4,233,040 | A | * | 11/1980 | Vogelaar | A01D 41/12 180/68.1 |
| 4,439,218 | A | * | 3/1984 | Priepke | B01D 46/10 55/282.4 |
| 4,447,323 | A | * | 5/1984 | Jackson | E02B 8/026 210/158 |
| 5,183,487 | A | * | 2/1993 | Lodico | F01P 11/12 55/289 |
| 5,571,406 | A | * | 11/1996 | Mensching | B01D 29/01 210/154 |

FOREIGN PATENT DOCUMENTS

WO    2014/105556 A1    7/2014

* cited by examiner

*Primary Examiner* — Robert Pezzuto

(57) ABSTRACT

A leaf screen cleaner system to remove crop material such as leaves and stalks from one or more leaf screens of a combine harvester, the system including a slotted carriage movable in opposing directions, a screen having plural members, each of the plural members disposed in a respective slot of the carriage. A pulley assembly is coupled to the carriage and a feeder house is coupled to the pulley assembly. Based on pivotal motion of the feeder house, the carriage moves relative to the screen along the plural members.

17 Claims, 8 Drawing Sheets

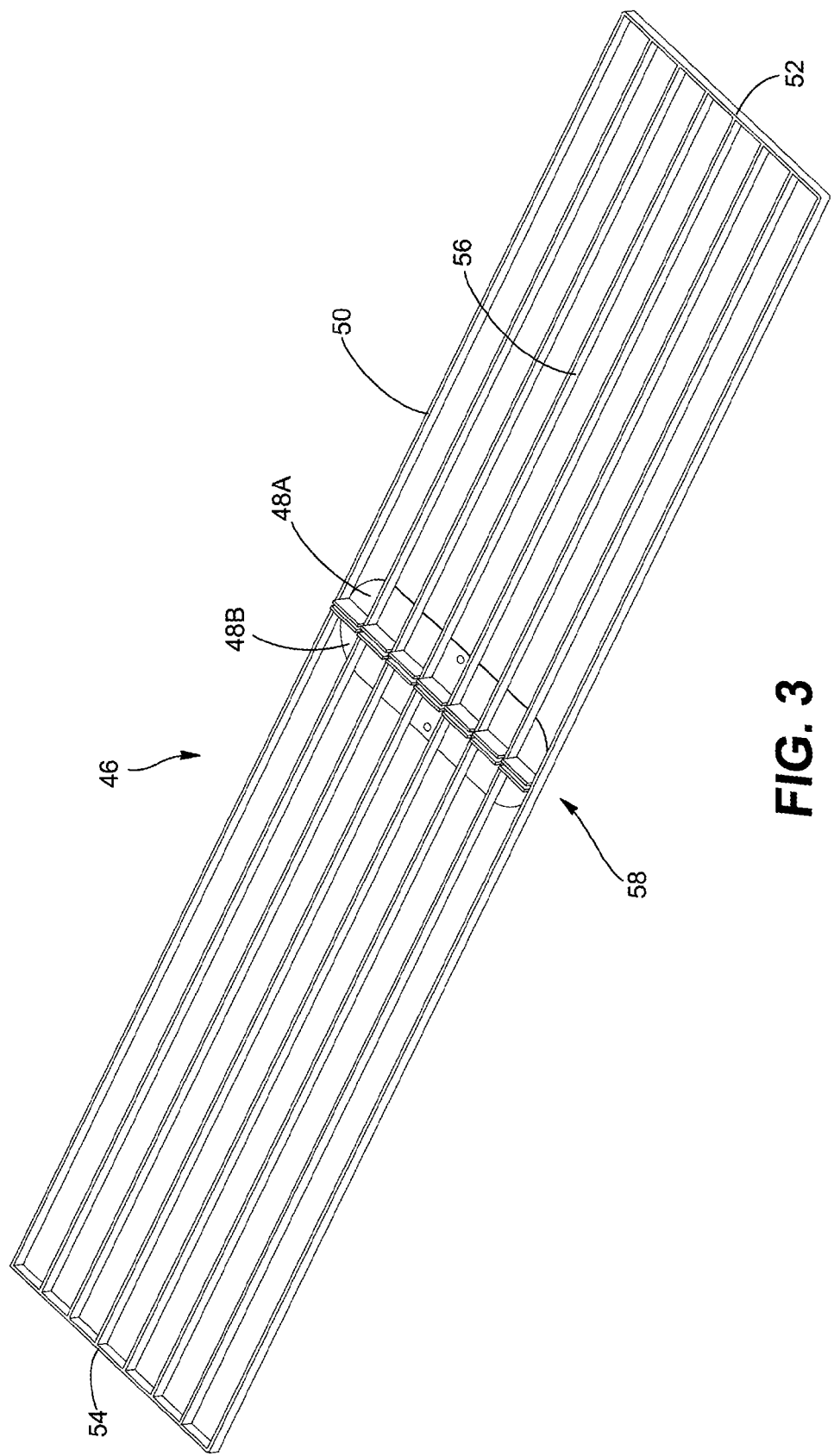

LEAF SCREEN CLEANER

CROSS REFERENCE TO RELATED APPLICATION

This application claims the benefit of U.S. Provisional Application No. 61/919,963, filed Dec. 23, 2013, which is hereby incorporated by reference in its entirety.

BACKGROUND OF THE INVENTION

Field of Invention

The present disclosure is generally related to agriculture technology, and, more particularly, combine harvesters.

Description of Related Art

Combine harvesters are provided with cleaning systems used to remove chaff and other residue from the threshed grain. Within the cleaning system, oscillating sieve assemblies in conjunction with air flow remove the chaff from the threshed grain, the latter falling through the chaffer and sieve assembly to an oscillating clean grain pan. The clean grain pan, in turn, directs the clean grain to a discharge auger that elevates the grain to an onboard storage bin. A second oscillating pan directs materials other than grain over the edge of the bottom sieve assembly to a different discharge outlet for recirculation back through the threshing, separating and cleaning apparatus to extract the previously unthreshed grain. A fan produces an airstream through the chaffer and sieve assembly that entrains the lighter non-grain particles and carries them out the rear of the harvester. However, the fan also draws air from the outside through one or more air intakes, which may lead to crop residue, such as leaves, being drawn toward the air intakes as well. For instance, for some crops, such as corn, corn leaves may adhere to leaf screens located on the bottom of the combine harvester, resulting in the leaf screen becoming plugged and hampering the cleaning process.

SUMMARY OF THE INVENTION

In one embodiment, a system comprising a slotted carriage movable in opposing directions; a screen comprising plural members, each of the plural members disposed in a respective slot of the carriage; a pulley assembly coupled to the carriage; and a feeder house coupled to the pulley assembly, wherein based on pivotal motion of the feeder house, the carriage moves relative to the screen along the plural members.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 3 is a schematic diagram, in fragmentary isometric bottom view, of example bi-directional carriages of an example embodiment of a leaf screen cleaner.

DESCRIPTION OF EXAMPLE EMBODIMENTS

Figure 1:
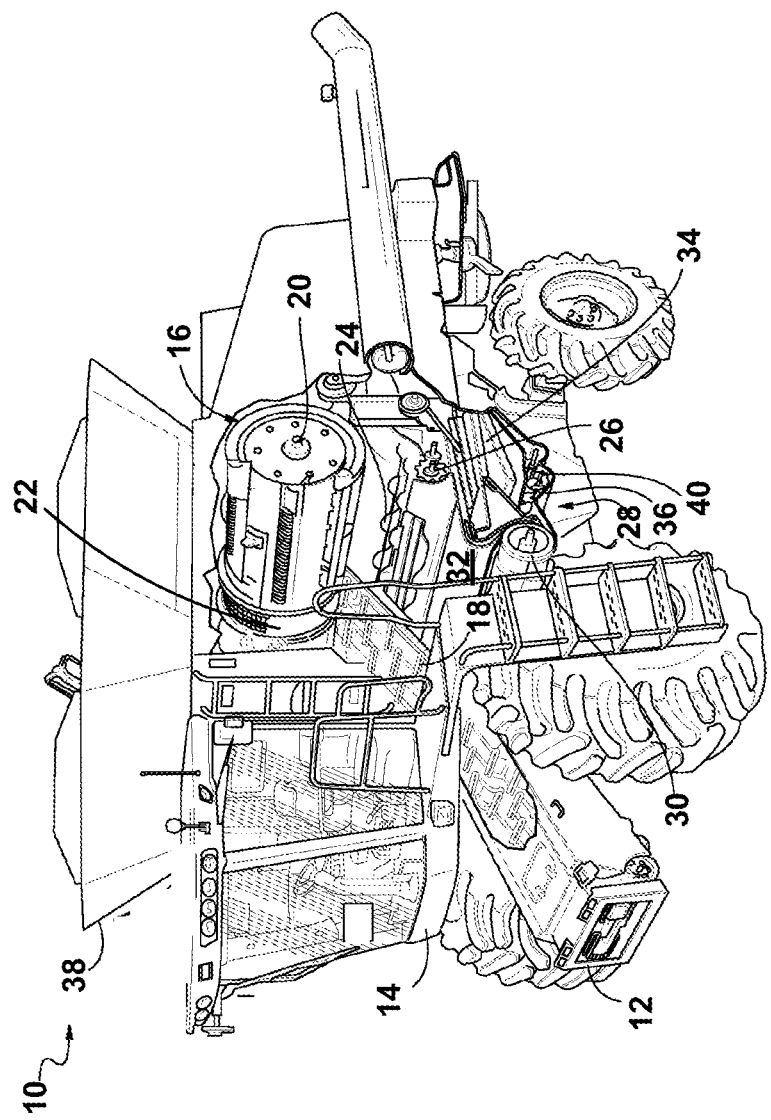
FIG. 1 is a schematic diagram, in partial cutaway perspective view, of an example combine harvester in which an example embodiment of leaf screen cleaner is implemented.

Certain embodiments of a leaf screen cleaner and associated methods are disclosed that remove crop material (e.g., leaves, stalks, among other biomass) from one or more leaf screens of a combine harvester. In one embodiment, the leaf screen cleaner comprises plural slotted carriages (e.g., two) that move in opposing directions adjacent and proximal to a leaf screen to scrape leaves (and/or other crop material) from the screen based on the upward and downward movement of a feeder house to which the carriages are operably coupled. For instance, an embodiment of a leaf screen cleaner uses a fixed leaf screen (e.g., with either bars, slats, or a combination thereof) and at least two (2) slotted carriages that move bi-directionally as guided by the screen members that are disposed in the respective slots and a track system. The carriages may begin in a neutral position (e.g., the center of the leaf screen, or some offset thereof), behind the outward facing surfaces of the leaf screen, with portions of the carriages (e.g., fingers extending from a base) extending beyond the screen members (e.g., slats, one of a plurality of different geometrically-shaped bars, such as round bars, etc.) to enable a scraping action across the screen members during operation. The carriages may be biased to the neutral position (e.g., held centrally by a spring or other biasing mechanism), and are each affixed to one end of a cable or other connecting member (e.g., chain, rope, etc.) that is part of a pulley assembly. The other end of the cable is coupled to the feeder house (e.g., directly, or indirectly via one or more cylinders used to raise and lower the feeder house). When the feeder house is raised (e.g., at the end of a crop row when turning the machine around to start another row), the raising or pivoting action of the feeder house causes the cable to move linearly along a set (e.g., one or more) of rotating pulleys, causing the carriages to move outward to achieve a scraping action across the plural screen members to remove the crop material. In some instances, the crop material is displaced along the leaf screen from a high velocity region of the leaf screen to a low velocity region, from which the crop material falls off the leaf screen. When the feeder house is lowered (e.g., to begin harvesting of the crop of a crop row), the biasing action of the track system causes a return of the carriages to the neutral position.

Digressing briefly, crop material is often drawn to one or more leaf screens due to operation of the cleaning system fan of the combine harvester. Such conditions may lead to plugging off of the cleaning fan air inlet during extended hours of field operation. Past techniques for removing the crop material from the leaf screen(s) include cycling off, and then on, the combine harvester (e.g., hence shutting down the fan). If shutting down the combine harvester is unsuccessful in removing the crop material (e.g., given stubborn adherence to the leaf screen, such as via intertwining of the crop material to each other and the screen, moist conditions facilitating adherence, etc.), an operator may have to exit the cab of the combine harvester and venture underneath the machine to physically remove the crop material. In contrast, by virtue of normal combine harvester operations (e.g., raising and lowering of the feeder house, with or without operator intervention), certain embodiments of a leaf screen cleaner clears the leaf screens of crop material, which may obviate completely, or significantly, any operator intervention and/or sophisticated controls to achieve removal of the crop material.

Having summarized certain features of a leaf screen cleaner of the present disclosure, reference will now be made in detail to the description of the disclosure as illustrated in the drawings. While the disclosure will be described in connection with these drawings, there is no intent to limit it to the embodiment or embodiments disclosed herein. For instance, in the description that follows, one focus is on a combine harvester having a transverse-rotor design, though it should be appreciated within the context of the present disclosure that combine harvesters of other designs, such as hybrid, conventional, axial, or dual axial, or even other machines where there is a need to remove substances (e.g., crop material or substances other than crop material) from a screen with little to no operator intervention (e.g., based on a pivoting or raising and lowering of a machine component during normal operations), may be used and hence are contemplated to be within the scope of the present disclosure. Also, though emphasis is placed on operations of a leaf screen cleaner in association with a lower leaf screen, other or additional leaf screens of the combine harvester may be deployed with a leaf screen cleaner, and hence are contemplated to be within the scope of the disclosure. Further, though leaves are described below as an example crop material that is cleared from the leaf screens, it should be appreciated that other crop material may likewise be removed by one or more embodiments of the leaf screen cleaner. Additionally, although the description identifies or describes specifics of one or more embodiments, such specifics are not necessarily part of every embodiment, nor are all various stated advantages necessarily associated with a single embodiment or all embodiments. On the contrary, the intent is to cover all alternatives, modifications and equivalents included within the spirit and scope of the disclosure as defined by the appended claims. Further, it should be appreciated in the context of the present disclosure that the claims are not necessarily limited to the particular embodiments set out in the description.

Note that references hereinafter made to certain directions, such as, for example, "front", "rear", "left" and "right", are made as viewed from the rear of the combine harvester looking forwardly.

Referring now to FIG. 1, shown is an example combine harvester 10 in which an embodiment of a leaf screen cleaner may be implemented. It should be understood by one having ordinary skill in the art, in the context of the present disclosure, that the example combine harvester 10 shown in FIG. 1 is merely illustrative, and that the leaf screen cleaner may be implemented on other combine configurations or other machines in some embodiments. The example combine harvester 10 is shown in FIG. 1 without a header, and comprises a feeder house 12 that is raised and lowered by one or more cylinders located underneath, and coupled to, the feeder house 12 (not shown), as is known. The combine harvester 10 also comprises an operator cab 14, followed by a processing compartment that includes a processing apparatus 16. In operation, the combine harvester 10 includes a harvesting header at the front of the machine that cuts crop materials and delivers the cut crop materials to the front end of the feeder house 12. Such crop materials are moved upwardly and rearwardly within and beyond the feeder house 12 by a conveyor 18 until reaching a thresher rotor 20 of the processing apparatus 16. The thresher rotor 20 comprises a single, transverse rotor, such as that found in a Gleaner® Super Series Combine by AGCO. The thresher rotor 20 processes the crop materials in known manner and passes a portion of the crop material (e.g., heavier chaff, corn stalks, etc.) toward the rear of the combine harvester 10 and another portion (e.g., grain and possibly light chaff) through a cleaning process, as described below. In some embodiments, such as in axial flow designs, the conveyor 18 may convey the cut crop material to a beater before reaching a rotor or rotors.

In the processing apparatus 16, the crop materials undergo threshing and separating operations. In other words, the crop materials are threshed and separated by the thresher rotor 20 operating in cooperation with certain elements of a rotor cage 22, for instance, well-known foraminous processing members in the form of threshing concave assemblies and separator grate assemblies, with the grain (and possibly light chaff) escaping through the concave assemblies and the grate assemblies and onto one or more distribution augers 24 located beneath the processing apparatus 16. Bulkier stalk and leaf materials are generally retained by the concave assemblies and the grate assemblies and are disbursed out from the processing apparatus 16 and ultimately out of the rear of the combine harvester 10. The distribution augers 24 uniformly spread the crop material that falls upon it, with the spread crop material conveyed to accelerator rolls 26. The accelerator rolls 26 speed the descent of the crop material toward a cleaning system 28. Also shown is a transverse, air blowing apparatus 30 (e.g., fan, or equivalently, a blower), which discharges pressurized air through one or more ducts, such as ducts 32 (e.g., which in one embodiment, includes an upper duct and lower duct, as explained below, though not limited to two ducts) to the cleaning system 28 to facilitate the cleaning of the heavier crop material directly beneath the accelerator rolls 26 while causing the chaff to be carried out of the rear of the combine harvester 10. As noted above, the fan 30 may also draw leaves to one or more leaf screens, leading to potential choking of the air flow stream through the machine. The cleaning system 28 includes plural stacked sieves 34 (e.g., also referred to herein as an oscillating sieve assembly), through which the fan 30 provides an additional push or influence (through a lower duct 32) of the chaff flow to the rear of the combine harvester 10. The cleaned grain that drops to the bottom of the cleaning system 28 is delivered by an auger 36 that transports the grain to a well-known elevator mechanism (not shown), which conveys the grain to a grain bin 38 located at the top of the combine harvester 10. Any remaining chaff and partially or unthreshed grain is recirculated through the processing apparatus 16 via a tailings return auger 40. As combine processing is known to those having ordinary skill in the art, further discussion of the same is omitted here for brevity.

Figure 2:
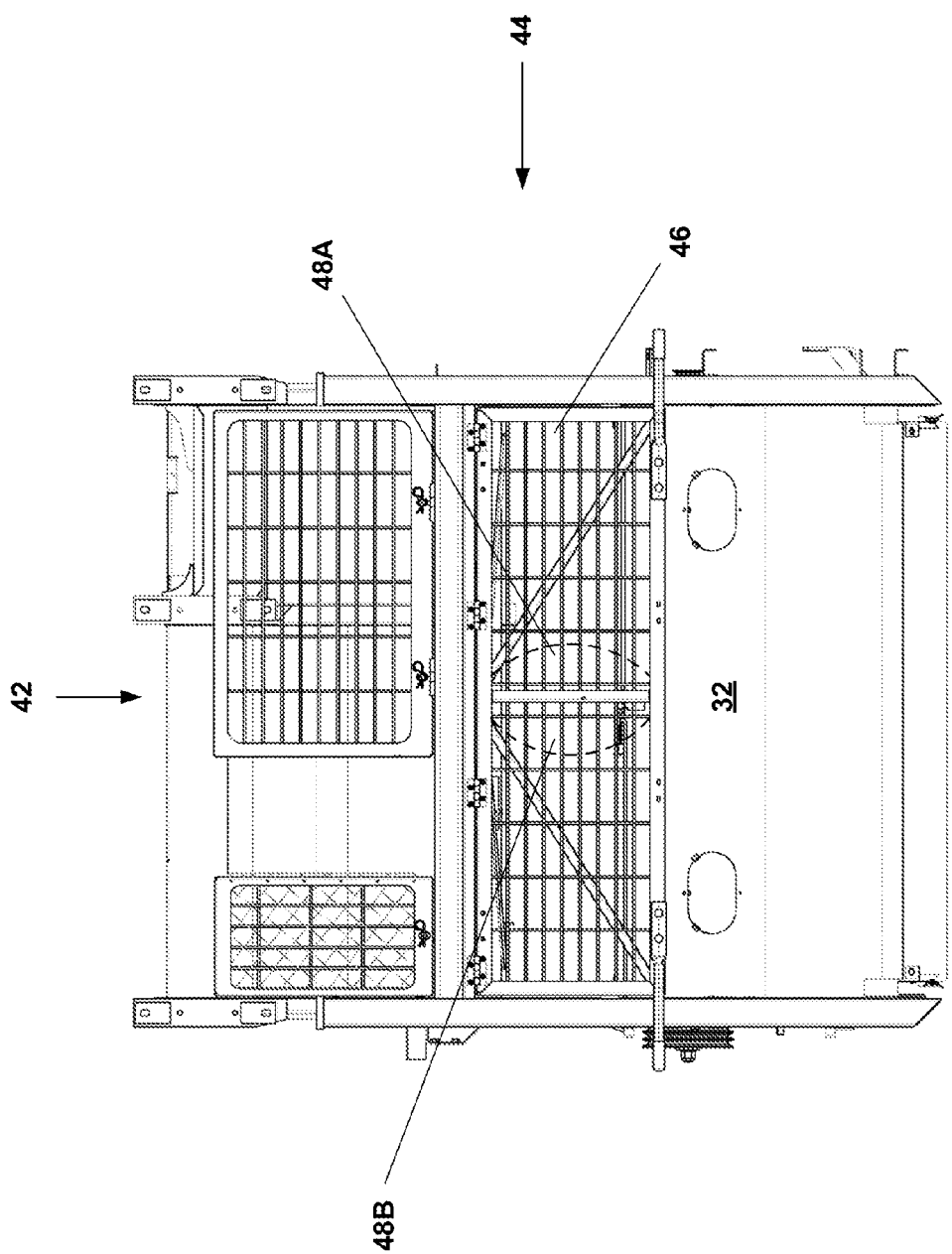
FIG. 2 is a bottom, fragmentary view of a portion of a combine harvester showing an example leaf screen for which an example embodiment of a leaf screen cleaner is implemented.

Referring now to FIG. 2, shown is a bottom, fragmentary view of a portion of a combine harvester 10 (FIG. 1) showing an example leaf screen that is used to illustrate certain embodiments of a leaf screen cleaner. As noted above, other or additional leaf screens on the bottom or oriented orthogonally to those depicted in FIG. 2 may deploy a leaf screen cleaner in some embodiments. It should be appreciated by one having ordinary skill in the art that other bottom orientations may use a different arrangement of screens, and would similarly benefit from a leaf screen cleaner of the present disclosure. The orientation shown in FIG. 2 includes a front portion 42 and a left portion 44 of the combine harvester 10. Also shown is a lower leaf screen 46 with a partial view of two carriages 48 (e.g., 48A and 48B, shown in phantom) positioned adjacent to, and above the leaf screen 46. Also depicted in FIG. 2 is a lower duct 32, which spans transversely across the combine harvester 10 proximal to the leaf screen 46. In one embodiment, the leaf screen 46 is segregated into separate hinged sections that may be independently opened, and in some embodiments, the leaf screen 46 may be a single hinged section (or unhinged in some embodiments). There may be additional leaf screens on the underside of the combine harvester 10 or elsewhere (e.g., on the side of the machine) in some embodiments, as indicated above. Emphasis is placed in the description below on removing leaves from the screen 46 using the carriages 48, with the understanding that other or additional screens may use the leaf screen cleaner.

Turning attention now to FIG. 3, shown is a schematic diagram, in fragmentary isometric view, of the two carriages 48A and 48B shown in FIG. 2 for an example embodiment of a leaf screen cleaner. In some embodiments, the carriages 48A and 48B may be of a different geometry than depicted in FIG. 2. The leaf screen 46 comprises an outer, rectangular frame 50 (though other geometries are contemplated) with a first outward (outer) end 52 and a second outward (outer) end 54. Disposed transversely between the first and second outer ends 52 and 54 are plural screen members, such as screen member 56. It should be appreciated that the transverse portion of the outer frame 50 may also be comprised of a screen member 56 of like configuration to the internal screen members 56 in some embodiments, such as depicted in FIG. 3. The screen member 56 is shown configured as a slat, though some embodiments may use screen members configured as round bars, among other geometric configurations and/or quantities (e.g., other than the quantity shown). In some embodiments, the screen members 56 may be oriented in a different direction than shown in FIG. 3. The carriages 48A and 48B move in opposing directions relative to each other, and also individually move in a bi-directional (opposing) manner. For instance, in the embodiment depicted in FIG. 3, the carriage 48A moves outward (toward first outward end 52) and, when positioned at or proximal to the first outward end 52 (e.g. when the feeder house 12 is raised, as explained further below), inward (toward second outward end 54). Similarly, the carriage 48B moves outward (toward second outward end 54) and, when at or proximal to the second outward end 54, inward (toward first outward end 52). In some embodiments, the outward and inward movement occurs concurrently (e.g., as carriage 48A moves toward the first outward end 52, the carriage 48B similarly moves toward the second outward end 54), though in some embodiments, the bi-directional movement of each or one of the carriages 48 may be independent of the other. Further, in some embodiments, additional carriages 48 may be used, and in some embodiments, fewer (e.g., a single) carriage 48 may be used. In some embodiments, the carriages 48A and 48B may be directly coupled to each other. For instance, the portion of the screen 46 covered by the bi-directional movement of the carriage 48A may be distributed among one or more additional like-moving carriages in some embodiments, or in some embodiments, one or both of the carriages 48 may slide along only a portion of the screen members 56 (e.g., the carriages 48A and/or 48B may slide along a fewer quantity of screen members 56 than depicted in FIG. 3). The carriages 48 are disposed adjacent each other at a neutral transverse position 58 of the screen 46. In the embodiment depicted in FIG. 3, the neutral position 58 comprises a central transverse position, though some embodiments may use another transverse location as the neutral position 58. In one embodiment, the carriages 48 are bi-directionally moveable in a transverse range of motion that spans between the neutral position 58 and the respective outward end 52 or 54. For instance, the carriage 48A moves between the neutral position 58 and the first outward end 52, and the carriage 48B moves between the neutral position 58 and the second outward end 54. In some embodiments, the transverse range of motion for both (or one) of the carriages 48 may be less, or greater (e.g., some overlap, such as upon return to neutral position 58). Note that the discussion above focuses on the transverse (e.g., side-to-side) orientation, though it should be appreciated that the vertical (or near vertical) orientations may similarly apply for screens with plural vertically-arranged screen members (and vertically moveable carriages), among other mechanisms of slidable movement.

Figure 4A:
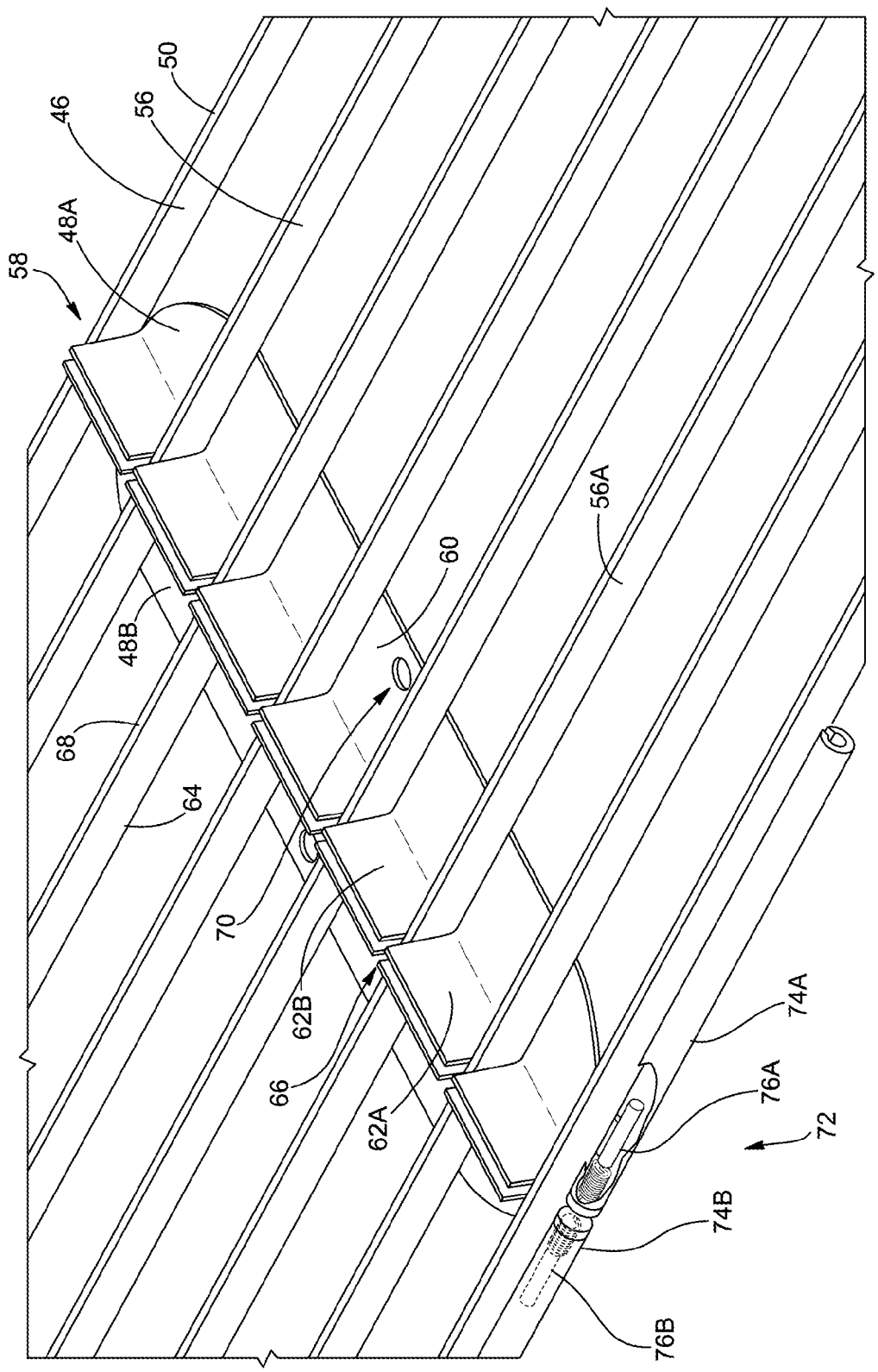
FIG. 4A is a schematic diagram, in a close-up, fragmentary isometric bottom view, of a track system and the carriages shown in FIG. 3 of an example embodiment of a leaf screen cleaner.

FIG. 4A shows a closer view of the leaf screen 46 and carriages 48 of FIG. 3. In the description for FIG. 4A, the focus is on the operation of carriage 48A, with the same or similar applicability understood for the carriage 48B. The carriage 48A comprises a base portion 60 and a slotted finger portion 62 (e.g., 62A and 62B). The finger portion 62 is angled relative to the base portion 60. In the embodiment depicted in FIG. 4A, the finger portion 62 is at a substantially ninety-degree angle relative to the base portion 60 (e.g., substantially "L" shaped), though not limited to this angular relationship. Note that since FIG. 4A is a bottom view, the base 60 resides above the leaf screen 46 and the slotted finger portion 62 extends beneath the leaf screen 46. If arranged according to a vertical leaf screen, the base portion 60 would reside behind the leaf screen 46 (e.g., relative to the front) and the finger portion 62 would extend past (in front of) the screen 46 (toward the front). Further, the base portion 60 and finger portion 62 may be of single-piece construction, or in some embodiments, multipiece construction and coupled (e.g., welded, tacked, bolted, etc.) together. Also, though shown as spanning a given dimension relative to the adjacent member(s) 56, the width or span of the finger portions 62 relative to the adjacent member(s) 56 may be different in some embodiments. Referring to the embodiment shown in FIG. 4A, one surface (e.g., ground facing in this orientation) of the base portion 60 is adjacent to (e.g., abutted against, or separated by a small gap) the upper edges 64 of each of the plural members 56. Each of the plural members 56 is disposed in a respective one of the slots 66. For instance, the screen member 56A is disposed in the slot 66 that resides between finger portion 62A and adjacent finger portion 62B. The carriage 48A slides along the plural members 56, with the edge (e.g., ground facing in this orientation) surfaces of the finger portions 62 extending beyond (e.g., beneath) a respective bottom (e.g., ground facing in this orientation) edge 68 of the screen member 56. In some embodiments, the finger portions may be flush with, or slightly above, the bottom edge 68 of each screen member 56. Also shown is a connecting aperture 70 in the base portion 60 of the carriage 48A, the location of which may be elsewhere in some embodiments. The connecting aperture 70 provides a location to which one end of a connecting member of a pulley assembly may be affixed to cause the bi-directional movement of the carriage 48A, the other end of the connecting member operably coupled to the feeder house 12 (FIG. 1). In some embodiments, additional connecting apertures may be used.

Also shown in FIG. 4A is a track system 72 (the other portion of the track system 72 on the opposing side of the frame 50 omitted for brevity). The track system 72 facilitates guided movement of the carriages 48. The track system 72 may be coupled to the frame 50 (e.g., integrated with, or welded to, tacked to, bolted or screwed to, etc.), or coupled to another portion of the combine harvester 10 (FIG. 1) and positioned adjacent the frame 50. In one embodiment, the track system 72 comprises a cylindrical tube 74 (e.g., 74A for carriage 48A, and 74B for carriage 48B, though some embodiments may use a single tube). Located and slidably moveable within the tube 74 is a cylindrical moving member 76 (e.g., 76A in the tube 74A and 76B in the tube 74B), shown in phantom. The cylindrical moving member 76 may be hollow like the tube 74, or a solid or semi-solid component. Though described using cylindrical geometries, the tube 74 and/or the moving member 76 may be configured with other geometries. In some embodiments, ball bearings or rollers or low-friction surfaces may be disposed within the tube 74 to facilitate the bi-directional movement of the moving members 76. In some embodiments, as depicted in the example of FIG. 4A, one end of each tube 74 may have secured thereto a spring or other biasing component that is attached at the other end of the biasing component to the moving member 76 to enable the moving member 76 to return to the neutral position 58 when the feeder house 12 is lowered. Other arrangements for the biasing member relative to the moving member 76 that enable return to a neutral position may be used in some embodiments, such as a spring surrounding (at least partially) the tube 74. In embodiments that use a single tube 74, a fixed member located within the tube 74, such as a divider, may have springs associated with each carriage 48 secured thereto on one respective end, the other respective ends of the spring coupled to the moving members 76. In some embodiments, a single spring may be disposed between, and connected to, the moving members 76A and 76B. In some embodiments, a spring or other biasing component may be directly coupled between the carriages 48A and 48B (in lieu of, or in addition to, the spring or biasing component of the track system 72). Note that the tubes 74A and 74B are only partially shown, and in some embodiments, extend along the entire length of the frame 50 and parallel to the plural members 56 (though some embodiments may use a shorter or greater length for the tubes 74). Although the track system 72 is described using a cylindrical moving member 76 slidably movable within a respective tube 74, some embodiments may use other track systems. For instance, one embodiment of a leaf screen cleaner may use a rail type system, where the moving member may comprise one or more wheels that enable guided traversal along the rail coincident with the bi-directional movement of the carriages 48.

Figure 4B:
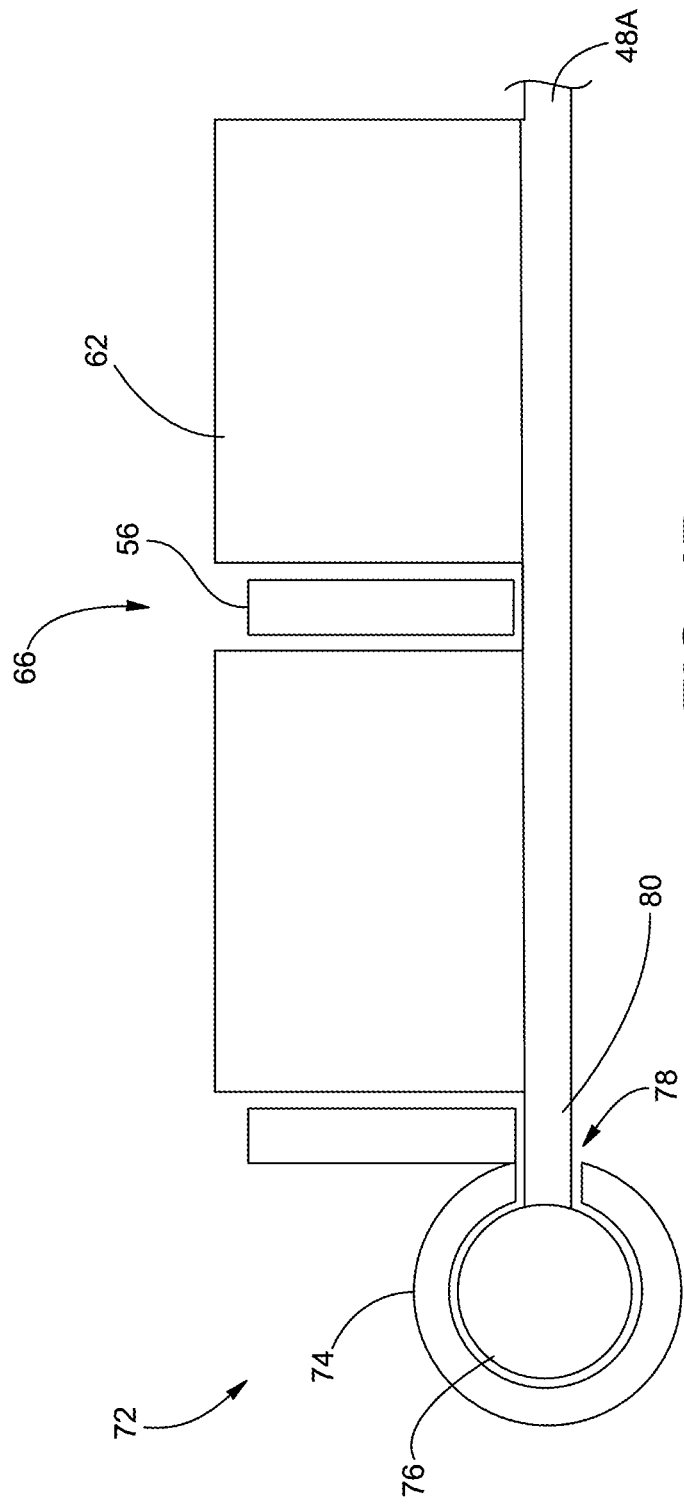
FIG. 4B is a block diagram illustrating an example track system for an example embodiment of a leaf screen cleaner.

FIG. 4B is a block diagram illustrating the example track system 72 shown in FIG. 4A, with emphasis on the carriage 48A (with similar applicability to the carriage 48B). Shown in end view of FIG. 4B is the tube 74, through which the moving member 76 moves. Note that the moving member 76 is shown as a solid component, though hollow components may be used in some embodiments. In one embodiment, the tube 74 comprises a slot 78 running lengthwise along the tube 74. The slot 78 enables the carriage 48A to be connected to the moving member 76 by virtue of a connecting piece 80 that extends between the moving member 76 and the carriage 48A. Also shown is the finger portion 62 with its slots 66 that permit sliding (e.g., transversely, such as into and out of the page of FIG. 4B) along the adjacent screen member 56 as shown and described above. Other mechanisms of ensuring the moving member 76 moves in coincidence with the carriage 48A may be implemented, as should be appreciated by one having ordinary skill in the art in the context of the present disclosure.

Figure 5A:
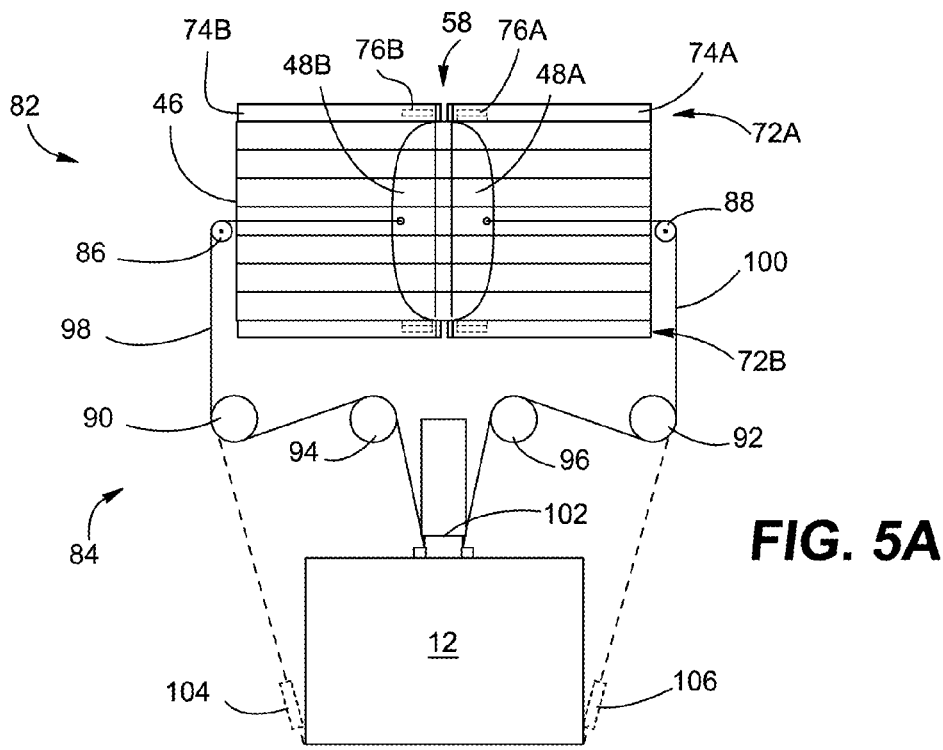
FIGS. 5A-5B are schematic diagrams in overhead plan, fragmentary view of an example embodiment of a leaf screen cleaner showing example operations when a feeder house transitions from a lowered position to a raised position.
Figure 5B:
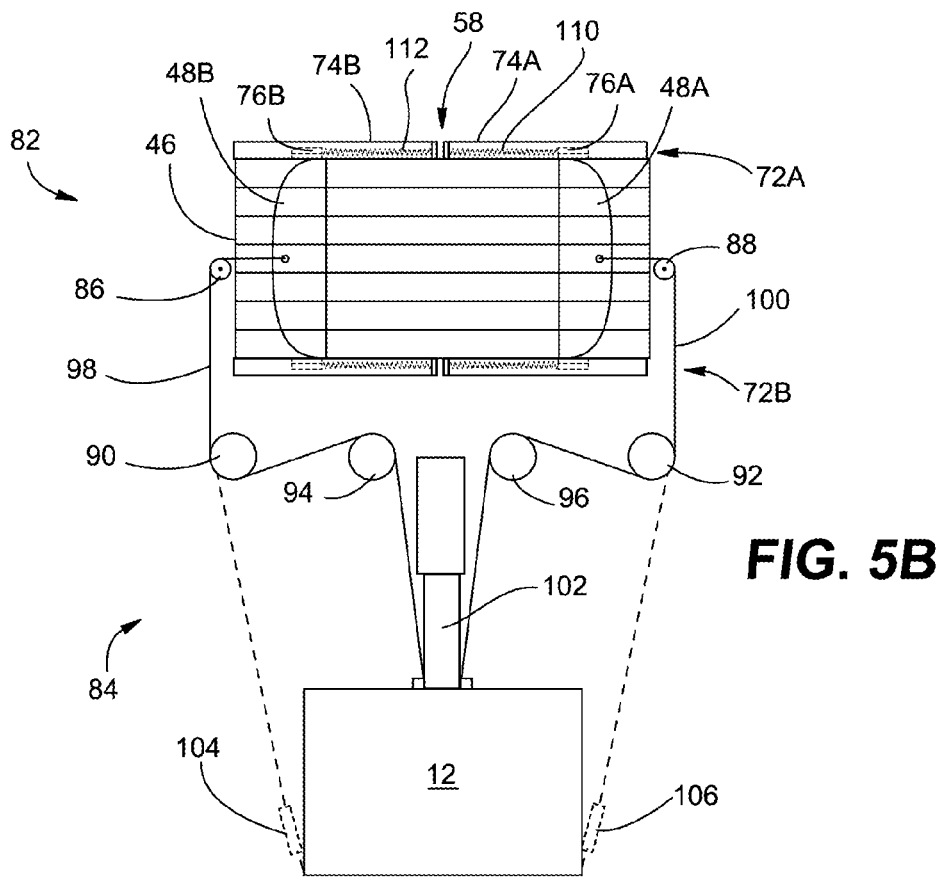
Figure 5C:
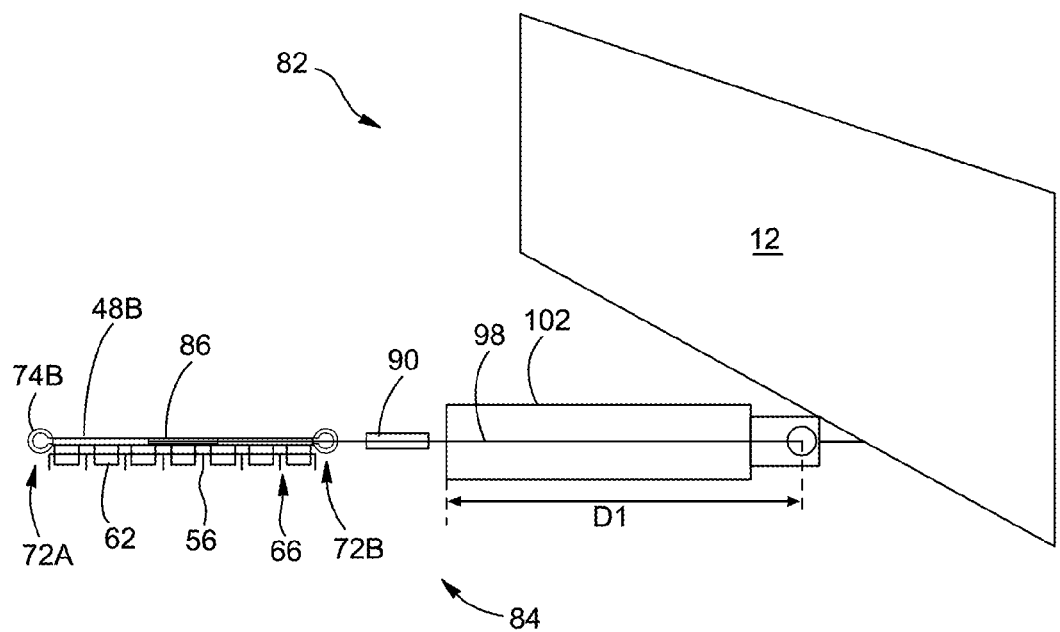
FIGS. 5C-5D are schematic diagrams in side elevation, fragmentary view of an example embodiment of a leaf screen cleaner showing example operations when a feeder house transitions from a lowered position to a raised position.
Figure 5D:
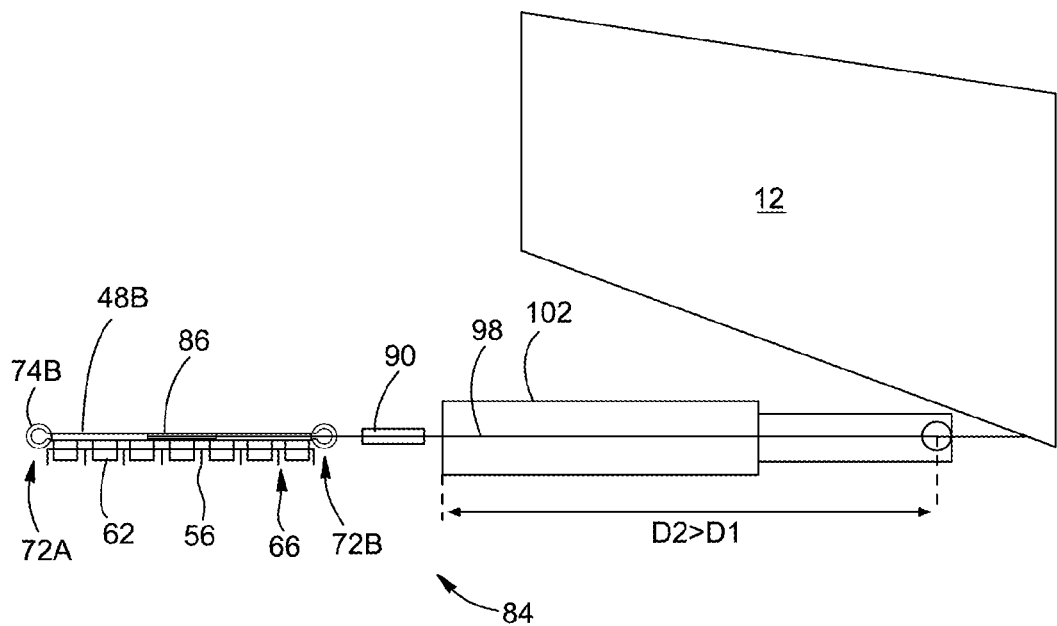

Referring now to FIGS. 5A-5D, FIGS. 5A and 5B show an overhead, fragmentary plan view of select components of a leaf screen cleaner 82 when the feeder house 12 is in the raised position (FIG. 5B) and lowered position (FIG. 5A). It is noted that since the views in FIGS. 5A and 5B are overhead and not bottom views, the right side of the leaf screen cleaner 82 is depicted in the side views of FIGS. 5C and 5D (e.g., carriage 48B versus carriage 48A). FIGS. 5C and 5D show the same operations for the leaf screen cleaner 82 in side elevation, fragmentary view. Note that some embodiments of a leaf screen cleaner 82 may have fewer or additional components than those depicted in FIGS. 5A-5D. Referring to FIGS. 5A and 5C, the example leaf screen cleaner 82 comprises the leaf screen 46 with plural screen member 56 and carriages 48 (e.g., 48A and 48B), each having a slotted finger portion 62 that slides transversely relative to the fixed members 56 of the leaf screen 46. The carriages 48 are coupled to a track system 72 (e.g., 72A and 72B, with description hereinafter directed primarily to track system 72A with the understanding that a similar description applies to the track system 72B). In some embodiments, a single side track system 72 (e.g., 72A only or 72B only) may be used. The track system 72 comprises the cylindrical tubes 74A and 74B, with the respective moving members 76A and 76B residing in the neutral position 58 when the feeder house 12 is in the lowered position. A pulley assembly 84 is also shown. The pulley assembly 84 comprises pulleys 86 and 88 adjacent opposing lateral sides of the screen 46, pulleys 90 and 92 forward of the respective pulleys 86 and 88, and pulleys 94 and 96 transverse or substantially transverse to the respective pulleys 90 and 92. The pulley assembly 84 further comprises connecting members 98 and 100 (e.g., cable, though other mechanisms for coupling as is known) that operably couple the movement of the feeder house 12 to the carriages 48B and 48A, respectively. Note that other arrangements of a pulley assembly may be used in some embodiments, for instance one with fewer (e.g., fewer connecting members, pulleys, etc.) or additional components, as should be appreciated by one having ordinary skill in the art in the context of the present disclosure. For instance, in some embodiments, the pulley assembly 84 may be arranged to use a single connecting member, such as connecting member 98 or connecting member 100 acting alone.

Focusing on the connecting member 98, the connecting member 98 is affixed to the carriage 48B, and routed over the pulleys 86, 90, and 94, and connected to a cylinder 102 (e.g., connected to the telescoping portion of the cylinder 102, such as a cylinder bore or ram). The cylinder 102 may be affixed to a bracket of the feeder house 12, and is used to raise and lower the feeder house 12 either automatically, or with operator intervention, as is known. In some embodiments, one or more cylinders 102 may be used. In one embodiment, the cylinder 102 is hydraulically actuated, though other types of cylinders using other types of motive forces (e.g., electrical) may be used for actuation in some embodiments. Similarly, and referring now to the connecting member 100, the connecting member 100 is affixed to the opposing carriage 48A, and routed over the pulleys 88, 92, and 96, and connected to the cylinder 102. Note from FIG. 5C the distance, D1, between one end of the cylinder 102 and the location where the connecting member 98 connects to the cylinder 102.

Note also that the pulley assembly 84 is merely one example of a plurality of different pulley arrangements that may be used to translate the feeder house movement to the carriage movement of the leaf screen cleaner 82, and that other arrangements may be used in some embodiments. For instance, the pulleys 94 and 96 may be omitted in some embodiments, and the connecting members 98 and 100 may be routed from the respective pulleys 90 and 92 to pulleys 104 and 106 (as depicted in phantom in FIG. 5A) that are located proximal to the feeder house 12, and from the pulleys 104 and 106 to attachment directly to the feeder house 12 (e.g., where the cylinder 102 is affixed to a bracket, flange, etc. at the cylinder-feeder house connection point, among other locations on the feeder house 12 in some embodiments). This latter described embodiment enables a direct connection of the connecting members 98 and 100, as opposed to the indirect coupling via the intervening cylinder 102. In some embodiments, the connecting members 98 and 100 may be connected directly to the cylinder 102 or to the feeder house 12 from the pulleys 86 and 88, respectively, or in some embodiments, coupled to respective cylinders when there are more than two cylinders 102 used. These and/or other pulley arrangements may be used in certain embodiments of leaf screen cleaners 82, and hence are contemplated to be within the scope of the disclosure. Note also that the relative dimensioning and/or geometry of certain components shown in FIGS. 5A-5D is merely illustrative, and that other dimensioning (e.g., a wider cylinder relative to the width of the feeder house 12) and/or geometry may characterize one or more components of certain embodiments of the leaf screen cleaner 82.

Referring now to FIGS. 5B and 5D, shown is the example leaf screen cleaner 82 when the feeder house 12 is in the raised position (e.g., when pivoted upward). As shown, the carriages 48 (e.g., 48A and 48B) have been moved outward based on the raising of the feeder house 12. The carriages 48 move transversely in a manner such that the slotted finger portion 62 slides past the respective screen members 56 disposed in the slots 66. Coincidentally with the movement of the carriages 48, the moving members 76A and 76B of the track system 72A (e.g., using 72A as an example, with similar applicability to the track system 72B) moves within the respective tubes 74A and 74B, biased by a respective spring 110 and 112 (e.g., shown connected to an interior end of the tube 74 proximal to the neutral position 58). As explained above, the connecting members 98 and 100 are routed past pulleys 86-96 of the pulley assembly 84 and affixed, in one embodiment, to the cylinder 102 (although other pulley arrangements may be used, such as direct attachment to the feeder house 12 via routing the connecting members 98 and 100 from the respective pulleys 90 and 92 directly to the feeder house 12 via respective pulleys 104 and 106). In one embodiment, the cylinder 102 is actuated to extend outward (e.g., forward), which places a force on the feeder house 12 causing it to pivot upward (e.g., to a raised position). The extension of the cylinder 102 results in a change in distance, D2 (where D2>D1) between one end of the cylinder 102 and the connecting end of the cylinder 102 to the feeder house 12 (e.g., where the connecting members 98 and 100 are secured to the cylinder 102). Stated otherwise, the raising of the feeder house 12 causes the connecting members 98 and 100 to transfer the upward movement of the feeder house 12 (via their connection to the cylinder 102) to the outward carriage movement (e.g., from the neutral position 58) via the connecting members 98 and 100 having an attachment through the pulleys 86-96 to the respective carriages 48B and 48A and moving members 76B and 76A of the track system 72A (and like components of the track system 72B). The outward movement of the carriages 48 result in a scraping action of the respective slotted finger portion 62 across the screen members 56, which causes the removal of the leaves from the leaf screen 46.

Figure 6:
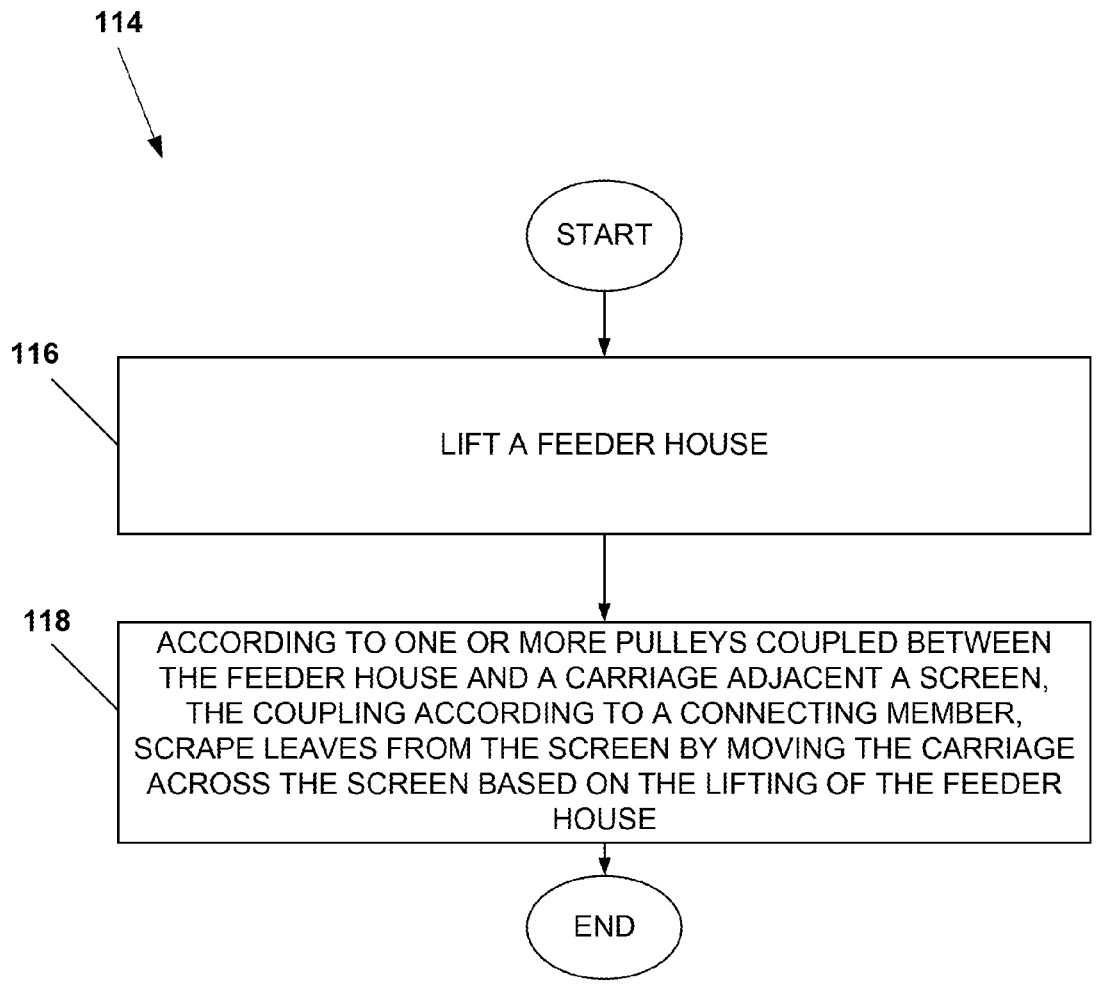
FIG. 6 is a flow diagram that illustrates an example embodiment of a leaf screen cleaner method.

Having described certain embodiments of a leaf screen cleaner 82, it should be appreciated within the context of the present disclosure that one embodiment of a leaf screen cleaner method, denoted as method 114 as illustrated in FIG. 6, comprises lifting a feeder house (116); and according to one or more pulleys coupled between the feeder house and a carriage adjacent a screen, the coupling according to a connecting member, scraping leaves from the screen by moving the carriage across the screen based on the lifting of the feeder house (118).

Any process descriptions or blocks in flow diagrams should be understood as representing steps in the process of an embodiment of a leaf screen cleaner method, and alternate implementations are included within the scope of the embodiments in which functions may be executed out of order from that shown or discussed, including in reverse order, depending on the functionality involved, as would be understood by those reasonably skilled in the art of the present disclosure.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and protected by the following claims.

At least the following is claimed:

1. A leaf screen cleaner system for use on a combine harvester, the system comprising:
   a slotted carriage movable in opposing directions;
   a screen comprising plural members, each of the plural members disposed in a respective slot of the carriage;
   a pulley assembly coupled to the carriage; and
   a feeder house coupled to the pulley assembly, wherein based on pivotal motion of the feeder house, the carriage moves relative to the screen along the plural members.

2. The system of claim 1, wherein each member comprises a first edge and a second edge, the first edge adjacent a base of the carriage and the carriage extending beyond the second edge.

3. The system of claim 2, wherein the carriage comprises a finger portion that comprises the slots, wherein the base is angled relative to the finger portion.

4. The system of claim 3, further comprising a cylinder coupled to the feeder house, wherein the pulley assembly comprises a connecting member affixed to the base on one end of the connecting member and the cylinder on an other end of the connecting member.

5. The system of claim 3, wherein the pulley assembly comprises a connecting member affixed to the base on one end of the connecting member and the feeder house on an other end of the connecting member.

6. The system of claim 1, further comprising a track assembly coupled to the carriage to facilitate movement of the carriage.

7. The system of claim 6, wherein the track assembly comprises a biased cylindrical member that is bi-directionally moveable within a tube.

8. The system of claim 1, wherein the plural members comprises plural slats.

9. The system of claim 1, further comprising:
a slotted second carriage movable in opposing directions; and
the pulley assembly or a second pulley assembly coupled to the second carriage, wherein based on the pivotal motion of the feeder house, the second carriage moves relative to the screen along a portion of the plural members not covered by the carriage.

10. The system of claim 9, further comprising a second moving member of a track assembly coupled to the second carriage to facilitate movement of the second carriage.

11. A combine harvester, comprising:
a leaf screen comprising plural members; and
a screen cleaning system, the screen cleaning system comprising:
a first slotted carriage bi-directionally movable along a first portion of the leaf screen;
a second slotted carriage bi-directionally movable along a second portion of the leaf screen;
a first set of pulleys coupled to the first carriage and a second set of pulleys coupled to the second carriage; and
a feeder house coupled to the first and second set of pulleys, wherein based on upward and downward movement of the feeder house, the first and second carriages move away or towards each other relative to the leaf screen along the plural members disposed in respective slots of the first and second carriages.

12. The combine harvester of claim 11, further comprising a cylinder coupled between the feeder house and the first and second carriages, wherein respective connecting members of the first and second set of pulleys are affixed to the first and second carriages and to the cylinder.

13. The combine harvester of claim 11, wherein respective connecting members of the first and second set of pulleys are affixed to the first and second carriages and to a bracket of the feeder house.

14. The combine harvester of claim 11, further comprising first and second moving members of a track assembly respectively coupled to the first and second carriages to facilitate movement of the first and second carriages.

15. The combine harvester of claim 11, wherein the plural members comprise slats or are of a cylindrical geometry.

16. The combine harvester of claim 11, wherein each of the plural members comprises a first edge and a second edge, the first edge adjacent a base of each carriage and each carriage extending beyond the second edge.

17. The combine harvester of claim 16, wherein each of the carriages comprises a finger portion that comprises the slots, wherein the base is angled relative to the finger portion.

\* \* \* \* \*